(12) United States Patent
Ross et al.

(10) Patent No.: US 8,710,122 B2
(45) Date of Patent: Apr. 29, 2014

(54) HALOGEN-FREE FLAME RETARDANTS FOR EPOXY RESIN SYSTEMS

(75) Inventors: Richard B. Ross, Cottage Grove, MN (US); Yi He, Roseville, MN (US); Lisa S. Lim, Sandy, UT (US); Haohao Lin, Austin, TX (US); Eumi Pyun, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 238 days.

(21) Appl. No.: 13/128,846

(22) PCT Filed: Nov. 24, 2009

(86) PCT No.: PCT/US2009/065624
§ 371 (c)(1),
(2), (4) Date: May 11, 2011

(87) PCT Pub. No.: WO2010/077493
PCT Pub. Date: Jul. 8, 2010

(65) Prior Publication Data
US 2011/0224331 A1    Sep. 15, 2011

Related U.S. Application Data

(60) Provisional application No. 61/120,523, filed on Dec. 8, 2008.

(51) Int. Cl.
C08K 5/521    (2006.01)
C08L 63/00    (2006.01)

(52) U.S. Cl.
CPC    *C08K 5/521* (2013.01); *C08L 63/00* (2013.01)
USPC    ..........................    523/447; 523/451

(58) Field of Classification Search
CPC ........... C08K 5/52; C08K 5/521; C08L 63/00
USPC ........... 523/400, 447, 451; 524/115, 121, 127
See application file for complete search history.

(56) References Cited

U.S. PATENT DOCUMENTS

| | | | |
|---|---|---|---|
| 3,811,992 A | | 5/1974 | Clark et al. |
| 3,819,518 A | | 6/1974 | Endler |
| 3,973,074 A | | 8/1976 | de Lissa et al. |
| 4,122,226 A | | 10/1978 | Vassiliou |
| 4,165,411 A | | 8/1979 | Marans et al. |
| 4,311,634 A | | 1/1982 | Vassiliou |
| 4,837,400 A | * | 6/1989 | Walter et al. ................. 524/145 |
| 5,091,608 A | * | 2/1992 | Gunther ....................... 174/84 R |
| 5,268,393 A | * | 12/1993 | Blount ............................ 521/85 |
| 5,587,448 A | * | 12/1996 | Engen ............................. 528/55 |
| 5,656,709 A | * | 8/1997 | Fukushima et al. .............. 528/9 |
| 5,739,187 A | | 4/1998 | Asano et al. |
| 6,001,270 A | | 12/1999 | Stephens et al. |
| 6,171,702 B1 | * | 1/2001 | Malhotra et al. ........... 428/411.1 |
| 6,362,279 B2 | | 3/2002 | Lichtenhan et al. |
| 6,448,324 B1 | | 9/2002 | Nodera et al. |
| 6,518,357 B1 | | 2/2003 | Rajagopalan et al. |
| 6,534,601 B1 | | 3/2003 | Park et al. |
| 6,551,417 B1 | * | 4/2003 | Rodzewich et al. .......... 148/250 |
| 6,982,049 B1 | | 1/2006 | Mabey et al. |
| 7,915,436 B2 | | 3/2011 | Lim et al. |
| 2003/0166765 A1 | | 9/2003 | Sugihara |
| 2004/0099178 A1 | * | 5/2004 | Jones et al. ................. 106/18.21 |
| 2004/0110878 A1 | | 6/2004 | Knop et al. |
| 2005/0215670 A1 | * | 9/2005 | Shimasaki et al. ............ 523/451 |
| 2005/0287362 A1 | | 12/2005 | Garcia-Ramirez |
| 2007/0166454 A1 | * | 7/2007 | Gupta .......................... 427/202 |
| 2007/0244229 A1 | | 10/2007 | Hong et al. |
| 2007/0259582 A1 | | 11/2007 | Kohei |
| 2008/0087466 A1 | | 4/2008 | Emerson |
| 2008/0090950 A1 | | 4/2008 | Costanzi |
| 2009/0104444 A1 | | 4/2009 | Garcia-Ramirez et al. |
| 2009/0124734 A1 | | 5/2009 | Pyun et al. |
| 2010/0048766 A1 | | 2/2010 | Cheng et al. |
| 2010/0087079 A1 | | 4/2010 | Pyun et al. |

FOREIGN PATENT DOCUMENTS

| | | | |
|---|---|---|---|
| EP | 0742261 | | 11/1996 |
| EP | 1285953 | | 2/2003 |
| EP | 1285953 | A1 * | 2/2003 |
| EP | 1403310 | | 3/2004 |
| EP | 1 580 320 | | 9/2005 |
| GB | 1105953 | | 3/1968 |
| GB | 1468 053 | | 11/1974 |
| JP | S54-141823 | | 11/1979 |
| JP | 57-123221 | * | 7/1982 |
| JP | 57123221 | A * | 7/1982 |
| JP | H02-172847 | | 7/1990 |
| JP | 03-119017 | | 5/1991 |
| JP | H07-028994 | | 1/1995 |
| JP | 10-017796 | | 1/1998 |
| JP | 2002-057442 | | 2/2002 |

(Continued)

OTHER PUBLICATIONS

Alexander B. Morgan et al., "Cone Calorimeter Analysis of UL-94 V-Rated Plastics," *Fire and Materials*, Nov. 6, 2007, pp. 254-283.
Test: ASTM Designation: E1354-08, "Standard Test Method for Heat and visible Smoke Release Rates for Materials and Products Using an Oxygen consumption Calorimeter[1]," (2008) 19 pages.
Test: ASTM Designation: E1740-07a, "Standard Test Method for Determining the Heat Release Rate and Other Fire-Test-Response Characteristics of Wallcovering composites Using a Cone Calorimeter[1]," (2008) 11 pages.
3M Data Sheet: "Scotchcast™ 4 Electrical Insulating Resin," (1992) 2 pages.
Office Action in Corresponding Japanese Patent Application No. 2011-539590.

*Primary Examiner* — Randy Gulakowski
*Assistant Examiner* — Ha Nguyen
(74) *Attorney, Agent, or Firm* — Gregg H. Rosenblatt

(57)    ABSTRACT

This disclosure relates to flame retardants that are useful for epoxy resin systems. Coating compositions and methods are provided the include an epoxy resin and a phosphate-containing flame retardant wherein the phosphate-containing flame retardant is selected from Group 1 metallic salts of a phosphate of a saccharide, Group 2 salts of a glycerophosphate, and Group 1 metallic salts of a polyphosphate. The provided flame retardants have low toxicity and are friendly to the environment.

17 Claims, No Drawings

(56) References Cited

FOREIGN PATENT DOCUMENTS

| | | |
|---|---|---|
| JP | 2002-201344 | 7/2002 |
| JP | 2005-236273 | 9/2005 |
| JP | 2007-302762 | 11/2007 |
| SU | 952110 | 4/1979 |
| WO | WO 99/43390 | 9/1999 |
| WO | WO 2004/007603 | 1/2004 |
| WO | WO 2005/078012 | 8/2005 |
| WO | WO 2005/106089 | 11/2005 |
| WO | WO 2007-100724 | 9/2007 |
| WO | WO 2007/100724 A2 * | 9/2007 |
| WO | WO 2007/100725 | 9/2007 |

* cited by examiner

HALOGEN-FREE FLAME RETARDANTS FOR EPOXY RESIN SYSTEMS

CROSS REFERENCE TO RELATED APPLICATIONS

This application is a national stage filing under 35 U.S.C. 371 of PCT/US2009/065624, filed Nov. 24, 2009, which claims priority to U.S. Provisional Application No. 61/120,523, filed Dec. 8, 2008, the disclosure of which is incorporated by reference in its/their entirety herein.

FIELD

This disclosure relates to flame retardants that are useful for epoxy resin systems.

BACKGROUND

Resins are used in many industries and for many different purposes. Resins are widely used, for example, in the electrical and electronics industry as seals for splices and other equipment along with other applications. Resins used in such electrical and electronic applications generally require the possession of an acceptable set of electrical properties, a degree of flame resistance or flame retardancy, and an acceptable level of processability. To meet increasingly sensitive environmental and safety considerations there is also now a desire to offer resin compositions that are substantially free of halogenated and halogen-containing compounds and materials. Currently available resins lack the ability to offer a desired set of electrical, performance, processing and flame resistance characteristics without the incorporation of halogenated or halogen-containing compounds and materials.

SUMMARY

Advantageously, flame retardant resin systems according to the present disclosure do not include halogenated or halogen-containing compounds as flame retardants. It is also advantageous to have epoxy resin systems that incorporate flame retardants that have low toxicity and are friendly to the environment. This is particularly important if the epoxy resin systems are in contact with the environment as are resin systems that are used to splice and/or to seal electrical splices.

In one aspect, a coating composition is provided that includes an epoxy resin and a phosphate-containing flame retardant, wherein the flame retardant has the formula:

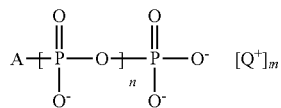

wherein A can be O⁻, a conjugate base of glycerol, or a conjugate base of a saccharide or derivative of a saccharide, wherein n=0-5, wherein Q is a monovalent cation or a divalent cation, wherein when Q is a monovalent cation then m=n+2, and wherein when Q is a divalent cation then n=0 and m=1.

In another aspect, a coating composition is provided that includes an epoxy resin and a phosphate-containing flame retardant, wherein the phosphate-containing flame retardant is selected from Group 1 metallic salts of a phosphate of a saccharide, Group 2 salts of a glycerophosphate, Group 1 metallic salts of a phosphate, and Group 1 metallic salts of a polyphosphate.

In yet another aspect, a method of making a coating composition is provided that includes providing an epoxy resin and mixing in a phosphate-containing flame retardant, wherein the phosphate-containing flame retardant is selected from Group 1 metallic salts of a phosphate of a saccharide, Group 2 salts of a glycerophosphate, Group 1 metallic salts of a phosphate, and Group 1 metallic salts of a polyphosphate.

In this document;

"ASTM" refers to test methods standardized by the American Society for Testing and Materials;

"conjugate base" refers to a saccharide or glyceride in which at least one of the OH groups has been deprotonated;

"polyphosphate" refers to a salt of metaphosphoric acid or polyphosphoric acid, regardless of cation; and "UL" refers to Underwriters Laboratory and test methods developed and published therefrom.

The provided compositions and methods offer epoxy resin systems that contain environmentally friendly and low toxicity flame retardants. The flame retardants are either on the Generally Regarded As Safe (GRAS) list that is maintained by the Food and Drug Administration of the United States or they are chemically closely related. When the provided epoxy systems as used as, for example, sealants for electrical cables that are subsequently buried in the ground, any of the provided flame retardants that bloom out of the sealant are likely environmentally friendly and have low toxicity to the environment.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope or spirit of the present invention. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The coating composition that is provided includes an epoxy resin. The epoxy resin can be part of an epoxy resin system which can, optionally include an effective amount of curative for the resin. Epoxy resin systems can include one-part and/or two-part systems. Desirably, for electronic applications, the epoxy resin is electronic grade.

Exemplary epoxy resin systems include a two-part epoxy resin available as 3M SCOTCHCAST 4 ELECTRICAL INSULATING RESIN from 3M Company of Saint Paul, Minn. Examples of useful epoxy resins include 2,2-bis[4-(2,3-epoxypropoxy)-phenyl]propane (diglycidyl ether of bisphenol A) and materials available as EPON 828, EPON 1004, and EPON 1001F, available from Hexion Specialty Chemicals Co., Houston, Tex., DER-331, DER-332 and DER-334, available from SPI-Chem, West Chester, Pa. Other suitable epoxy resins include glycidyl ethers of phenol formaldehyde novolac (e.g., DEN-43 and DEN-428, available from SPI-Chem.).

Optionally, the epoxy resin system may contain one or more hardeners, initiators and/or catalysts (collectively referred to herein as "curative"), typically in an amount that is effective for chemically cross-linking the thermosetting resin (i.e., and effective amount of curative). The choice of curative and the amount to use typically will depend on the type of thermosetting resin selected, and will be well known to the skilled artisan. Exemplary curatives for epoxy resins include amines (including imidazoles), mercaptans, and Lewis acids.

The provided coating composition also includes a phosphate-containing flame retardant. The flame retardant has the formula:

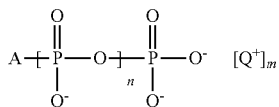

wherein A can be O⁻, a conjugate base of glycerol, or a conjugate base of a saccharide or a derivative of a saccharide, wherein n=0-5, wherein Q is a monovalent cation or a divalent cation, wherein when Q is a monovalent cation then m=n+2, and wherein when Q is a divalent cation then n=0 and m=1. When A is O⁻, then the flame retardant is a metaphosphate or a polyphosphate salt. Examples of phosphate-containing flame retardants where A is O⁻ include potassium or sodium metaphosphate, potassium or sodium triphosphate, and potassium or sodium hexametaphosphate. Typically, when A is O⁻, Q is selected from sodium or potassium.

In some embodiments, A can be a conjugate base of glycerol. Exemplary flame retardants of these embodiments include, for example, calcium glycerophosphate, magnesium glycerophosphate, and manganese glycerophosphate. A can also be a conjugate base of a saccharide or substituted saccharide. Typically the saccharide is a monosaccharide such as, for example, pentose sugars and hexose sugars. Exemplary monosaccharides that are useful as flame retardants include aldoses, and ketoses. Aldoses include aldopentoses such as ribose, arabinose, xylose, and aldohexoses such as allose, altrose, glucose, mannose, gulose, idose, galactose, and talose. Exemplary flame retardants derived from aldoses include D-glucose-1-phosphate disodium salt and D-glucose-1-phosphate dipotassium salt. These salts, as well as all of the salts contemplated by Formula (I) can exist as hydrates. Ketoses include ketopentoses such as ribulose and xylulose and ketohexoses such as psicose, fructose, sorbose and tagatose. Conjugate bases of disaccharides, oligosaccharides, and polysaccharides are also contemplated for A. For example, in some embodiments A can be a conjugate base of a disaccharide such as lactose, maltose, sucrose, or cellobiose. In other embodiments, A can be a conjugate base of a polysaccharide such as amylase, amylopectin, glucogen, or cellulose. Conjugate bases of derivatives of saccharides are also contemplated as flame retardants in the provided compositions. Such derivatives include sugar alcohols, sugar acids, amino sugars and N-acetylneuaminates. Exemplary sugar alcohols include glycol, glycerol, erythritol, threitol, arabitol, xylitol, rebitol, mannitol, sorbitol, dulcitol, iditol, isomalt, amltitol, and lactitol. Exemplary sugar acids include aldonic acids, ulosonic acids, uronic acids and aldaric acids. A typical aldonic acid is ascorbic acid. Typical ulosonic acids include neuraminic acid, ketodeoxyoctulosonic acid, gluconic acid, and glucoronic acid. Aminosugars include, for example, glucosamine. N-acetylneuraminates such as sialic acid are also within the scope of useful sugar derivatives.

As indicated by Formula (I), the provided flame retardants have at least one polyphosphate moiety. The polyphosphate can have one phosphate (n=0) up to six phosphates (n=5). In some embodiments, the flame retardants can have two or even more polyphosphate moieties. An example of a useful diphosphate is fructose-1, 6-diphosphate.

The phosphate-containing flame retardants of the provided compositions can be selected from Group 1 metallic salts of a phosphate of a saccharide, Group 2 salts of a glycerophosphate, and Group 1 metallic salts of a polyphosphate. Typically, the Group 1 metallic salts are selected from sodium and potassium and the Group 2 salts are selected from calcium and magnesium. Other divalent cations can also be present and can be selected from, for example, divalent ions of transition metals. A typically transition metal divalent ion is manganese.

The phosphorus-containing flame retardants can be in used in any amount in curable and/or cured compositions according to the present disclosure. For example, the phosphorus-containing flame retardants can be present in an amount in a range of from 1 to 20 percent by weight, typically 5 to 20 percent by weight, and more typically 10-15 percent by weight, based on the total weight of the curable and/or cured composition.

The curable compositions can be formed by simple mixing; however, it is generally desirable to use a technique capable of forming a uniform dispersion. In one technique, flame retardant and/or phosphorus-containing flame retardants are mixed into the thermosetting resin using a high shear mixer such as, for example, a high speed mixer available as SPEEDMIXER DAC 150FVZ from FlackTek, Inc. of Landrum, S.C.

The curable compositions may be cured, for example by conventional methods well known in the art, including by mixing (in the case of two-part thermosetting resins), heating, exposure to actinic or thermal radiation, or any combination thereof resulting in a cured composition. As discussed above, the curable compositions can contain polymerization initiators (curatives)—either thermal or UV/visible light polymerization initiators well known to those of skill in the art.

Typically the provided curable compositions can be two-part epoxy systems. Each part of the two-part epoxy systems can be packaged separately in, for example, separate compartments in a two-part polyethylene bag. One reactive component of the epoxy system, for example, the oxirane-containing compound can be isolated in one part of the two-part polyethylene bag. The other reactive component, for example a diol, can be isolated in the other part of the two-part polyethylene bag. A curative such as an acid catalyst can be included in the diol-containing part of the bag. The phosphorous-containing flame retardant can be in either part of the two-part polyethylene bag or both as long as it does not react with the other components co-located in the bag. When the provided curable compositions are used, the two part polyethylene bag is ruptured, the two components are mixed, and the composition cures over a period of a few minutes to several hours.

There are a number of ways to test the efficacy of flame retardants. One standard that is typically used is ASTM E 1354-08, "Standard Test Method for Heat and Visible Smoke release Rates for Materials and Products Using an Oxygen Consumption calorimeter", approved Jan. 1, 2008. This test method provides for the measurement of the time to sustained flaming, heat release rate (HRR), peak, and total heat release.

Heat release data at different heating fluxes can also be obtained by this method. The sample is oriented horizontally, and a spark ignition source is used. Cone calorimetry has long been a useful tool for quantitating material flammability. Cone calorimetry analysis of UL-94 V-rated plastics is described, for example, by A. Morgan and M. Bundy, Fire Mater, 31, 257-283 (2007). Another important measurement of flame retardancy is provided by the FIGRA or fire growth rate which is calculated as:

(FIGRA)=Peak HRR/time to Peak HRR(kW/m$^2$·sec)

The data for the Examples has been presented using these measurements.

One useful embodiment of the provided compositions is for use as a two-part epoxy insulating and encapsulating resin for making underground electrical splices. Flame retardants are desirable in such formulations to prevent flame formation if the splice suddenly becomes hot due to, for example, an electrical short. The use of the provided phosphate-containing flame retardants provides resistance to the rate of heat release and to the fire growth rate as shown in the Examples. In addition, since most of the provided flame retardants are either on the GRAS list or are structurally similar to materials on the GRAS list, it is believed that these materials will be much less toxic to the environment if they leach out of the curable compositions over time.

Objects and advantages of this invention are further illustrated by the following examples, but the particular materials and amounts thereof recited in these examples, as well as other conditions and details, should not be construed to unduly limit this invention.

EXAMPLES

Sodium metaphosphate, potassium triphosphate, sodium hexametaphosphate, sodium polyphosphate, and calcium glycerophosphate were obtained from VWR International, West Chester, Pa. Sodium tripolyphosphate, D-glucose-1-phosphate disodium salt hydrate, and D-glucose-1-phosphate dipotassium salt hydrate were obtained from Sigma Aldrich, Milwaukee, Wis. Magnesium glycerophosphate and manganese glycerophosphate were obtained from Spectrum Chemicals, Gardena, Calif. Scotchcast 4 is an epoxy resin system available from 3M, Saint Paul, Minn.

Flame retardant fillers for Examples 1-10 were first mixed into Part B of Scotchcast 4 resin using a SPEEDMIXER DAC 150FVZ, available from Flack Tek Inc., Landrum, S.C., at 3000 rpm for 1 min, and then Part A of Scotchcast 4 resin was mixed in also using a SPEEDMIXER DAC 150FVZ at 3000 rpm for 1 min. The total wt % of flame retardant in the mixed resin was 15%. The weight ratio of Part A/Part B was 1.34. The mixed Scotchcast 4 resin was poured into a mold of 5.0 cm×5.0 cm×0.5 cm, and then cured at 50° C. for 1 hr. For the Comparative Example the Scotchcast 4 resin was mixed without the addition of any flame retardant.

The cured resins for Comparative Example 1 and Examples 1-10 were subjected to evaluation using ASTM E 1354-08, the only difference being the sample size which was as is described above. The test results (heat release rate (peak and average)) and the FIGRA or fire growth rate are displayed in Table 1.

For all examples, the concentration of flame retardant was 15 weight percent (wt %).

TABLE 1

Flammability Testing of Scotchcast 4 with Added Flame Retardants

| Ex. | Flame Retardant | Chemical Structure | Test Results (HRR in kW/m$^2$) |
|---|---|---|---|
| *CE1 | None | None | FIGRA: 13.57<br>Peak HRR: 2170.70<br>Avg HRR: 711.89 |
| 1 | Potassium metaphosphate | | FIGRA: 5.87<br>Peak HRR: 968.54 kW/m$^2$<br>Avg. HRR: 511.18 kW/m$^2$ |
| 2 | Potassium Triphosphate | | FIGRA: 10.59<br>Peak HRR: 1483.22<br>Avg. HRR: 709.06 |
| 3 | Sodium tripolyphosphate | | FIGRA: 9.31<br>Peak HRR: 1395.96<br>Avg. HRR: 665.24 |
| 4 | Sodium hexametaphosphate | | FIGRA: 6.01<br>Peak HRR: 1051.98<br>Avg. HRR: 522.15 |

TABLE 1-continued

Flammability Testing of Scotchcast 4 with Added Flame Retardants

| Ex. | Flame Retardant | Chemical Structure | Test Results (HRR in kW/m$^2$) |
|---|---|---|---|
| 5 | Sodium polyphosphate | *—[O—P(=O)(O$^-$)—O]$_n$—* Na$^+$ | FIGRA: 6.46<br>Peak HRR: 1065.62<br>Avg. HRR: 554.88 |
| 6 | Calcium glycerophosphate | Ca$^{2+}$ with glycerophosphate structure | FIGRA: 7.43<br>Peak HRR: 1114.8<br>Avg. HRR: 609.3 |
| 7 | Magnesium Glycerophosphate | Mg$^{2+}$ with glycerophosphate structure | FIGRA: 4.98<br>Peak HRR: 896.51<br>Avg. HRR: 510.25 |
| 8 | Manganese Glycerophosphate | Mn$^{2+}$ with glycerophosphate structure | FIGRA: 6.70<br>Peak HRR: 1038.64<br>Avg. HRR: 555.00 |
| 9 | D-Glucose 1-phosphate disodium salt hydrate | D-Glucose 1-phosphate disodium salt •xH$_2$O | FIGRA: 4.33<br>Peak HRR: 887.09<br>Avg. HRR: 515.2 |
| 10 | D-Glucose 1-phosphate dipotassium salt hydrate | D-Glucose 1-phosphate dipotassium salt •xH$_2$O | FIGRA: 7.11<br>Peak HRR: 959.29<br>Avg. HRR: 589.56 |

*CE—comparative example—SC-4 with no added flame retardant

The data in Table 1 show that the provided flame retardants can significantly freduce the flamability of SCOTCHCAST 4 epoxy resin system with respect to peak heat release rate, average heat release rate, fire growth rate (FIGRA), and total heat release.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims set forth herein as follows. All references cited within this document are herein incorporated by reference in their entirety.

What is claimed is:

1. A coating composition comprising:
an epoxy resin; and
a phosphate-containing flame retardant, wherein the flame retardant has the formula:

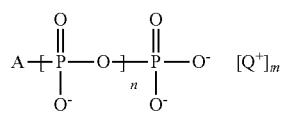

wherein A is selected from the group consisting of a conjugate base of glycerol, and a conjugate base of a saccharide or derivative of a saccharide, wherein n=0-5, wherein Q comprises manganese, wherein Q is a monovalent cation or a divalent cation, wherein when Q is a monovalent cation then m=n+2, and wherein when Q is a divalent cation then n=0 and m=1.

2. A composition according to claim 1, wherein A comprises a conjugate base of a saccharide and wherein the saccharide is derived from glucose.

3. A composition according to claim 1, wherein A comprises a conjugate base of 1,2,3-trihydroxypropane.

4. A coating composition comprising:
an epoxy resin; and
a phosphate-containing flame retardant,
wherein the phosphate-containing flame retardant is selected from Group 1 metallic salts of a phosphate of a saccharide, and wherein the phosphate-containing flame retardant is a monosaccharide.

5. A coating composition according to claim 4, wherein the epoxy resin comprises a thermosetting epoxy resin system.

6. A coating composition according to claim 4, wherein the epoxy resin comprises a two part epoxy resin system.

7. A coating composition according to claim 4, wherein the phosphate-containing flame retardant comprises one phosphate moiety.

8. A coating composition comprising:
an epoxy resin; and
a phosphate-containing flame retardant,
wherein the phosphate-containing flame retardant is selected from Group 1 metallic salts of a phosphate of a saccharide, wherein the flame retardant comprises D-glucose-1-phosphate disodium salt.

9. An article comprising a coating composition according to claim 1.

10. An article comprising a coating composition according to claim 4.

11. An underground electrical splice comprising a composition according to claim 1.

12. A method of making a coating composition comprising:
providing an epoxy resin, and
mixing in a phosphate-containing flame retardant
wherein the phosphate-containing flame retardant is selected from Group 1 metallic salts of a phosphate of a saccharide, and wherein the phosphate-containing flame retardant is a monosaccharide.

13. A method according to claim 12, wherein the epoxy resin comprises a two-part epoxy resin system.

14. A method according to claim 13, further comprising a two-part polyethylene bag wherein one part of the epoxy resin system is in one part of the bag, the other part of the epoxy resin system is in the other part of the bag, and the flame retardant is in one part of the bag or both parts of the bag.

15. An article comprising a coating composition according to claim 8.

16. An underground electrical splice comprising a composition according to claim 4.

17. An underground electrical splice comprising a composition according to claim 8.

* * * * *

UNITED STATES PATENT AND TRADEMARK OFFICE
CERTIFICATE OF CORRECTION

| | |
|---|---|
| PATENT NO. | : 8,710,122 B2 |
| APPLICATION NO. | : 13/128846 |
| DATED | : April 29, 2014 |
| INVENTOR(S) | : Richard Ross |

It is certified that error appears in the above-identified patent and that said Letters Patent is hereby corrected as shown below:

Column 2 (Title Page – Item (57) Abstract)
Line 3, Delete "the" and insert -- that --, therefor.

In the Specification

Column 3
Line 61, Delete "N-acetylneuaminates." and insert -- N-acetylneuraminates. --, therefor.
Line 63, Delete "amltitol," and insert -- maltitol, --, therefor.

Column 3-4
Line 67 (Col. 3) and Line 1 (Col. 4), Delete "glucoronic" and insert -- glucuronic --, therefor.

Column 7
Line 51, Delete "freduce" and insert -- reduce --, therefor.
Line 51, Delete "flamability" and insert -- flammability --, therefor.

Signed and Sealed this
Ninth Day of September, 2014

Michelle K. Lee
*Deputy Director of the United States Patent and Trademark Office*